June 1, 1926.

E. H. CAREY 1,587,283

ANTISKID DEVICE

Filed May 27, 1925

WITNESS

Wm. Bell

INVENTOR,
E. H. Carey,
BY John Steward
ATTORNEY.

Patented June 1, 1926.

1,587,283

UNITED STATES PATENT OFFICE.

ELMER H. CAREY, OF CLIFTON, NEW JERSEY.

ANTISKID DEVICE.

Application filed May 27, 1925. Serial No. 33,170.

This invention relates to traction attachments for vehicle wheels of the rubber-tired class. The principal object is to avoid the expense incident both to the purchase and upkeep of the common type of anti-skid device now used—consisting of two circular chains concentric with the wheel and chains connecting them across the wheel-tread—and provide anti-skid means which may be attached to and efficiently used in connection with the common fastening means for the rubber tire of the wheel, thus eliminating the circular chains. For holding the metal rim for the rubber tire on the wheel felly the means commonly used includes bolts which extend through the felly parallel with the wheel axis, each of these of course having a head at one end and a nut screwed thereon at the other, or it may be a nut screwed on each end, to produce the necessary clamping action. It being a part of my object to utilize these already-present devices as anchorages for the cross-chains or equivalent flexible cross-grips I further provide each such cross-grip with eyed end portions which are penetrated by the end portions of one of the bolts and swivelled on the enlargements thereon which may consist of or include the mentioned head and nut or two nuts. It is best that these end portions or members be constructed so that the intervening part of the cross-grip may be removed, leaving the end members on the wheel, for which purpose said end members may be hooks, as snap-hooks; and in one form of the invention I construct these hooks in such a way that they are well adapted to resist injury and offer no projection to interefere with a curb or other obstacle lateral of the wheel.

In the drawing:—

Figure 1:
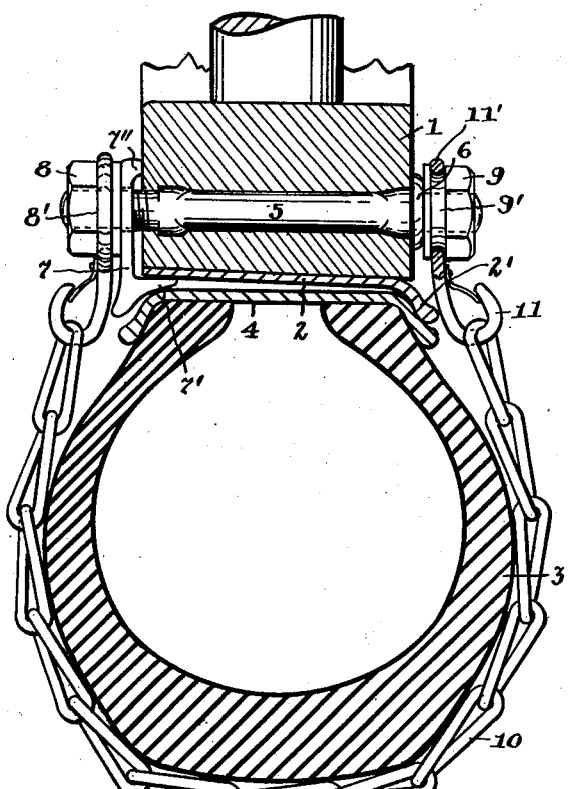
Fig. 1 is a transverse section of the felly and tire of a wheel of the pneumatic-tired class, showing my anti-skid means attached thereto.

In the drawing, 1 designates the wheel felly, which is of wood, and 2 indicates a metal rim with which it is shod and which is secured thereon in any way, the same having at one side the inclined bead or flange 2'. 3 is the pneumatic tire and 4 its chaneled metal rim which is slipped over the rim 2 and is held against the flange or bead 2' thereof, the rim being in the present example of the demountable type.

Following a known construction in common use the means for holding the tire on the rim in the present example is as follows: A bolt 5 passes through the felly parallel with the wheel axis; it has an integral head 6, here afforded by a flange thereon, at one end and its other end is threaded, as shown. On its threaded end is a wedge-member 7 which is penetrated by the bolt and whose wedge-proper 7' is adapted to jam between the two rims 2 and 4 (said member having a bearing against the felly at 7") and hold rim 4 rigidly against the flange 2' of rim 2. The jamming action of the wedge-member is effected by a nut which it is common to swivel in the wedge-member but which in the present case I screw on the threaded end of the bolt outward of the wedge-member as indicated at 8. When head 6 is a portion of limited thickness, as a flange as shown, I extend and thread the bolt outwardly thereof and screw thereon a nut 9. For the purpose of identifying each of those elements of the claims hereto appended which I term an "enlargement" I may remark that one such enlargement is here represented by the flange 6 and nut 9 and the other by the wedge-member 7 and nut 8.

The grip device is formed by a chain 10 whose end members 11 are detachable. In the present case each end member is a hook of the snap-hook type whose hook portion engages the next adjoining link in the chain and which is preferably formed of a suitable length of heavy wire bent to form such portion and also an eye 11'. Each nut 8 and 9 has a peripheral groove 8' and 9' and in forming the eye portion of the corresponding hook the wire of the hook is bent around the nut in its groove, so that the eye remains swivelled on the nut, or capable of turning thereabout. The purpose of swivelling the hook to the nut is not only to permit the grip device to articulate on the nut, thus to avoid bending strains on the hook when the traction attachment is in action, but to facilitate attaching the nut.

Figures 2, 3:
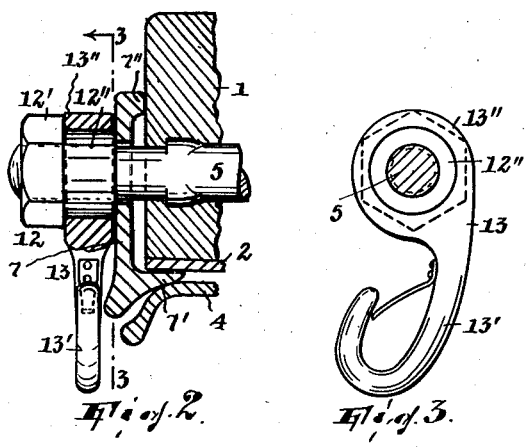
Fig. 2 is a sectional detail illustrating the mentioned modified form of the invention.
Fig. 3 is a section on line 3—3, Fig. 2.

In the modified form shown in Figs. 2 and 3 the mentioned swivelling is obtained in a different way. The nut 12 shown includes a faceted portion or head 12' and an inward reduced cylindrical extension or body 12″ which directly acts as the thrust-imparting portion of the nut when screwed up. There will be a similar nut screwed on the opposite end of the bolt. In this case each end member of the chain is shown as a hook 13 whose hook portion 13′ is formed to lie in the same plane with its eye portion 13″. This eye receives the extension or body 12″ of the nut and is of such width that when the nut is screwed up tight the hook is mounted to swivel or turn on the nut. The hook thus formed is less likely to encounter obstacles lateral of the wheel, as a curb, and because its eye is endless it cannot be opened by striking an obstacle.

In the actual construction herein shown and described it will be understood that I modify the form of the bolt somewhat—though not so as to alter its primary function as a part of the means for securing the tire-rim 2 on the wheel felly—by extending and threading it at 5′ to receive nut 9. Otherwise the tire-rim securing means remains unchanged. This specific equipment permits the cross-grip and nuts to be removed as a whole from the wheel, upon which to secure the tire-rim in place plain nuts will be substituted for the nuts 8.

Having thus fully described my invention what I claim and desire to obtain by Letters Patent is:—

1. In combination, with the felly of a wheel, a tire-rim thereon, a tire on the rim and means to secure the rim on the felly including a bolt extending through the felly substantially parallel with the wheel-axis and having clamping enlargements thereon flanking the felly and one of which includes a nut screwed on the bolt, a flexible cross-grip extending across the tire-tread and having eyed end portions swivelled on said enlargements and penetrated by the bolt.

2. In combination, with the felly of a wheel, a tire-rim thereon, a tire on the rim and means to secure the rim on the felly including a bolt extending through the felly substantially parallel with the wheel-axis and having clamping enlargements thereon flanking the felly and each of which includes a nut screwed on the bolt, a flexible cross-grip extending across the tire-tread and having eyed end portions swivelled on said nuts and penetrated by the bolt.

3. In combination, with the felly of a wheel, a tire-rim thereon, a tire on the rim and means to secure the rim on the felly including a bolt extending through the felly substantially parallel with the wheel-axis and having clamping enlargements thereon flanking the felly and one of which includes an integral flange on the bolt and a nut screwed on the bolt outward of the flange and the other of which includes a nut screwed on the bolt, a flexible cross-grip extending across the tire-tread and having eyed end portions swivelled on said nuts and penetrated by the bolt.

In testimony whereof I affix my signature.

ELMER H. CAREY